US012215548B2

(12) United States Patent
Horst et al.

(10) Patent No.: US 12,215,548 B2
(45) **Date of Patent: *Feb. 4, 2025**

(54) WINCH UTILITY

(71) Applicant: Tie Down, Inc., Atlanta, GA (US)

(72) Inventors: Benjamin Miller Horst, Decatur, GA (US); Warren van Nus, Lawrenceville, GA (US)

(73) Assignee: Tie Down, Inc., Atlanta, GA (US)

( * ) Notice: Subject to any disclaimer, the term of this patent is extended or adjusted under 35 U.S.C. 154(b) by 468 days.

This patent is subject to a terminal disclaimer.

(21) Appl. No.: 17/507,893

(22) Filed: Oct. 22, 2021

(65) Prior Publication Data

US 2022/0042374 A1 Feb. 10, 2022

Related U.S. Application Data

(63) Continuation of application No. 16/276,065, filed on Feb. 14, 2019, now Pat. No. 11,199,049.

(51) Int. Cl.
*E06C 7/12* (2006.01)
*B66D 1/12* (2006.01)
(Continued)

(52) U.S. Cl.
CPC .................. *E06C 7/12* (2013.01); *B66D 1/12* (2013.01); *B66D 1/42* (2013.01); *B66D 1/46* (2013.01)

(58) Field of Classification Search
CPC .............. B66D 1/12; B66D 1/42; B66D 1/46; B66D 3/20; B66D 3/26; B66D 5/18; B66D 5/30;
(Continued)

(56) References Cited

U.S. PATENT DOCUMENTS

| | | | |
|---|---|---|---|
| 37,470 | A | 1/1863 | Willis |
| 570,939 | A | 11/1896 | Mack |

(Continued)

FOREIGN PATENT DOCUMENTS

| | | | | |
|---|---|---|---|---|
| CN | 102009921 A * | 4/2011 | | |
| DE | 29814678 U1 * | 11/1998 | .............. | B66D 1/46 |

(Continued)

OTHER PUBLICATIONS

Horst, Benjamin Miller; Certificate of Correction for U.S. Appl. No. 16/276,065, filed Feb. 14, 2019, mailed Jan. 9, 2024, 1 pg.

(Continued)

*Primary Examiner* — Michael R Mansen
*Assistant Examiner* — Henrix Soto
(74) *Attorney, Agent, or Firm* — Buchalter

(57) ABSTRACT

A winch utility includes a main body, the main body including a shell, the shell defining an enclosure; an electric motor mounted to and contained within at least a portion of the shell; a controller attached to an inner part of the shell and in electronic communication with the electric motor; and a bobbin coupled to the electric motor; and a cable coupled to the bobbin at a bobbin end, the cable defining a terminal end distal to the bobbin end, the cable arranged to be coiled around the bobbin by rotation of the electric motor, wherein the terminal end of the cable is arranged outside of the shell, wherein the controller is configured to instruct the electric motor.

22 Claims, 10 Drawing Sheets

(51) Int. Cl.
*B66D 1/42* (2006.01)
*B66D 1/46* (2006.01)

(58) Field of Classification Search
CPC ...... B66D 2700/0141; B66D 2700/025; B66D 2700/0183; B66D 1/28; B66B 9/193; E06C 7/12; E06C 7/16
USPC .......................................................... 212/253
See application file for complete search history.

(56) References Cited

U.S. PATENT DOCUMENTS

| | | | | |
|---|---|---|---|---|
| 925,822 | A | 6/1909 | Mote | |
| 2,198,071 | A | 4/1940 | Artini | |
| 2,338,833 | A * | 1/1944 | Pinnock | A62B 1/02 182/103 |
| 2,877,905 | A | 3/1959 | Wiley | |
| 2,899,008 | A | 8/1959 | Larson | |
| 3,115,211 | A | 12/1963 | Ostrander, Jr. | |
| 3,237,719 | A | 3/1966 | Russell | |
| 3,291,258 | A | 12/1966 | Twilley | |
| 3,337,001 | A | 8/1967 | Huska et al. | |
| 3,343,630 | A | 9/1967 | Redman et al. | |
| 3,347,340 | A | 10/1967 | Huska et al. | |
| 3,358,849 | A | 12/1967 | Becker | |
| 3,402,788 | A | 9/1968 | Redman | |
| 3,428,145 | A * | 2/1969 | Lyon | E06C 7/16 182/103 |
| 3,491,853 | A | 1/1970 | Stillman, Jr. | |
| 3,592,294 | A | 7/1971 | Allen | |
| 3,896,904 | A | 7/1975 | Walker | |
| 3,908,801 | A | 9/1975 | Pohlman | |
| 3,935,926 | A | 2/1976 | Butler | |
| 3,948,352 | A | 4/1976 | Larson | |
| 4,102,433 | A | 7/1978 | Van Valkenburgh | |
| 4,145,028 | A * | 3/1979 | Kelley | B66D 1/00 242/404.1 |
| 4,155,422 | A | 5/1979 | Larson et al. | |
| 4,183,423 | A | 1/1980 | Lewis | |
| 4,512,440 | A * | 4/1985 | Bixby | E06C 1/381 187/241 |
| 4,550,806 | A | 11/1985 | Bocker | |
| 4,736,929 | A | 4/1988 | McMorris | |
| 4,802,643 | A | 2/1989 | Uys | |
| 5,429,253 | A | 7/1995 | McNett | |
| 5,582,270 | A | 12/1996 | Fowler | |
| 5,692,733 | A * | 12/1997 | Hiramatsu | B66D 5/30 254/362 |
| 5,842,684 | A | 12/1998 | Aho | |
| 6,189,654 | B1 | 2/2001 | Bailey et al. | |
| 6,241,215 | B1 * | 6/2001 | Gersemsky | A61G 7/1042 254/362 |
| 6,244,381 | B1 | 6/2001 | Ruble | |
| 6,269,909 | B1 | 8/2001 | Grimes et al. | |
| 6,527,088 | B1 * | 3/2003 | Fowler | B66B 9/187 187/254 |
| 6,533,070 | B1 | 3/2003 | Elrod | |
| 6,995,682 | B1 | 2/2006 | Chen et al. | |
| 7,380,742 | B2 | 6/2008 | Stevens | |
| 7,424,932 | B1 | 9/2008 | Murphy | |
| 7,686,566 | B1 | 3/2010 | Murphy | |
| 7,850,144 | B2 * | 12/2010 | Hashiguchi | B66D 5/30 254/273 |
| 7,850,145 | B2 | 12/2010 | Heravi et al. | |
| 7,900,745 | B1 | 3/2011 | Tindal | |
| 7,909,139 | B2 * | 3/2011 | Blue | A01M 31/02 182/103 |
| 8,464,833 | B2 | 6/2013 | Lee | |
| 8,689,937 | B2 | 4/2014 | Grado | |
| 8,887,865 | B2 * | 11/2014 | Matharu | E06C 7/186 182/8 |
| 9,217,285 | B2 | 12/2015 | Connors | |
| 9,404,305 | B1 | 8/2016 | Messick | |
| 9,556,008 | B2 | 1/2017 | Ogden | |
| 9,856,697 | B2 | 1/2018 | Reyes | |
| 9,944,495 | B2 * | 4/2018 | Webber | B66B 9/193 |
| 10,415,309 | B2 | 9/2019 | Liu et al. | |
| 10,421,651 | B1 | 9/2019 | Coleman et al. | |
| 11,199,049 | B2 * | 12/2021 | Horst | B66D 1/12 |
| 11,254,550 | B2 | 2/2022 | Coles | |
| 11,274,494 | B2 | 3/2022 | Leng | |
| 11,420,849 | B2 | 8/2022 | Liu et al. | |
| 11,505,226 | B1 | 11/2022 | Taranto | |
| 11,834,908 | B2 | 12/2023 | Garcia et al. | |
| 2007/0163982 | A1 | 7/2007 | Lichinchi | |
| 2007/0267250 | A1 | 11/2007 | Wolff | |
| 2007/0269303 | A1 * | 11/2007 | Quare | E06C 7/12 414/785 |
| 2010/0237306 | A1 * | 9/2010 | Eschelbacher | B66D 5/30 254/362 |
| 2013/0068559 | A1 | 3/2013 | Grado | |
| 2014/0246271 | A1 | 9/2014 | Davies | |
| 2015/0275579 | A1 | 10/2015 | Reyes | |
| 2017/0107082 | A1 | 4/2017 | Webber | |
| 2018/0022588 | A1 * | 1/2018 | Ho | B66D 1/54 254/362 |
| 2018/0170725 | A1 | 6/2018 | August et al. | |
| 2018/0229982 | A1 * | 8/2018 | Limb | B66D 1/38 |
| 2019/0014773 | A1 | 1/2019 | Lamb | |
| 2019/0233266 | A1 | 8/2019 | Delaney et al. | |
| 2020/0102789 | A1 | 4/2020 | Young | |
| 2020/0263496 | A1 | 8/2020 | Horst et al. | |
| 2021/0079727 | A1 | 3/2021 | Garcia et al. | |
| 2021/0198944 | A1 | 7/2021 | Pozgay et al. | |
| 2022/0259021 | A1 | 8/2022 | Schell | |
| 2022/0397002 | A1 | 12/2022 | Brus | |
| 2024/0240522 | A1 | 7/2024 | Aamir et al. | |
| 2024/0240523 | A1 | 7/2024 | Aamir et al. | |

FOREIGN PATENT DOCUMENTS

| | | | | |
|---|---|---|---|---|
| DE | 102016004351 | | 10/2017 | |
| FR | 2797905 | | 3/2001 | |
| JP | 2018204306 | | 12/2018 | |
| KR | 20110112950 | A * | 10/2011 | |
| WO | 2007132272 | | 11/2007 | |
| WO | 2015119505 | | 8/2015 | |
| WO | WO-2018136075 | A1 * | 7/2018 | B66D 3/20 |
| WO | 2020167329 | | 8/2020 | |
| WO | 2024155696 | | 7/2024 | |
| WO | 2024155708 | | 7/2024 | |

OTHER PUBLICATIONS

Amazon; Article entitled: "Werner 36-32 MT Series Replacement Inner Lock Kit", located at <https://www.amazon.com/Werner-36-32-Replacement-Inner-Lock/dp/B009AXDLFO/ref=sr_1_2?crid=335TRI4MLKFIF&keywords=MT-13+werner&qid%E2%80%A6>, accessed on Jan. 12, 2023, 6 pgs.

Amazon; Article entitled: "Werner Aluminum Extension Ladder Locks—Model 28-11", located at <https://www.amazon.com/Werner-Aluminum-Extension-Ladder-Locks/dp/B009JU43B4/ref=zg_bs_553474_sccl_7/143-1381346-7509635?psc=1>, accessed on Jan. 11, 2023, 6 pgs.

Horst, Benjamin Miller; Notice of Allowance for U.S. Appl. No. 16/276,065, filed Feb. 14, 2019, mailed Jul. 19, 2021, 19 pgs.

Horst, Benjamin; International Preliminary Report on Patentability for PCT Application No. PCT/US19/29033, filed Apr. 25, 2019, mailed Aug. 26, 2021, 11 pgs.

Horst, Benjamin; International Search Report and Written Opinion for PCT Application No. PCT/US19/29033, filed Apr. 25, 2019, mailed Jan. 27, 2020, 12 pgs.

Aamir, Mohammed; Non-Final Office Action for U.S. Appl. No. 18/413,953, filed Jan. 16, 2024, mailed May 23, 2024, 33 pgs.

Aamir, Mohammed; Requirement for Restriction/Election for U.S. Appl. No. 18/413,953, filed Jan. 16, 2024, mailed Mar. 13, 2024, 8 pgs.

Aamir, Mohammed; Non-Final Office Action for U.S. Appl. No. 18/414,058, filed Jan. 16, 2024, mailed May 17, 2024, 23 pgs.

(56) References Cited

OTHER PUBLICATIONS

Aamir, Mohammed; Requirement for Restriction/Election for U.S. Appl. No. 18/414,058, filed Jan. 16, 2024, mailed Mar. 14, 2024, 9 pgs.
Aamir, Mohammed; International Search Report and Written Opinion for PCT Application No. PCT/US24/11828, filed Jan. 17, 2024, mailed Jun. 12, 2024, 12 pgs.
Aamir, Mohammed; International Search Report and Written Opinion for PCT Application No. PCT/US24/11814, filed Jan. 17, 2024, mailed Jun. 4, 2024, 13 pgs.
Aamir, Mohammed; Invitation to Pay Additional Fees for PCT/US2024/011828, filed Jan. 17, 2024, mailed Mar. 25, 2024, 2 pgs.
Aamir, Mohammed; Invitation to Pay Additional Fees for PCT/US2024/011814, filed Jan. 17, 2024, mailed Apr. 8, 2024, 2 pgs.
Aamir, Mohammed; Final Office Action for U.S. Appl. No. 18/413,953, filed Jan. 16, 2024, mailed Oct. 28, 2024, 29 pgs.
Final Office Action for U.S. Appl. No. 18/414,058, dated Nov. 6, 2024, 27 Pages.

* cited by examiner

WINCH UTILITY

REFERENCE TO RELATED APPLICATIONS

This application is a continuation of U.S. patent application Ser. No. 16/276,065, filed Feb. 14, 2019, entitled "Winch Utility," which is incorporated by reference herein in its entirety.

TECHNICAL FIELD

This disclosure relates to winches. More specifically, this disclosure relates to powered winches.

BACKGROUND

In various applications, movement of items from one location to another can be a challenge. Some motorized solutions exist but are noisy, run on gasoline that can have fumes and expose users to danger, and require continuous operation.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a winch utility including at least one shelf, and a main body, the shelf connected to a main body, the main body comprising a shell, the shell defining an enclosure, the shell defining a cable port; an electric motor mounted to and contained within at least a portion of the shell; a controller attached to an inner part of the shell and in electronic communication with the electric motor; a bobbin coupled to the electric motor; and a cable coupled to the bobbin at a bobbin end, the cable defining a terminal end distal to the bobbin end, the cable arranged to be coiled around the bobbin by rotation of the electric motor, wherein at least a portion of the cable is arranged within the cable port and wherein the terminal end of the cable is arranged outside of the shell, wherein the controller instructs the electric motor, and wherein motion of the electric motor causes the cable to become one of: coiled around the bobbin and uncoiled from the bobbin.

Also disclosed is a winch utility for use with a track section, the winch utility including a main body, the main body comprising an electric motor; a controller in electronic communication with the electric motor; a bobbin coupled to the electric motor; and a cable coupled to the bobbin at a bobbin end, the cable defining a terminal end distal to the bobbin end attached to the track section, the cable arranged to be coiled around the bobbin by rotation of the electric motor; and a remote control in electronic communication with the controller, the remote control comprising at least one operation button, wherein the controller instructs the electric motor to become one of: coiled around the bobbin and uncoiled from the bobbin, and wherein operation of the electric motor causes the winch utility to move with respect to the track section.

Also disclosed is a method of using a winch utility with a track section, the method including: obtaining a winch utility, the winch utility comprising: a main body, the main body comprising an electric motor; a controller in electronic communication with the electric motor; a bobbin coupled to the electric motor; and a cable coupled to the bobbin at a bobbin end, the cable defining a terminal end distal to the bobbin end attached to the track section, the cable arranged to be coiled around the bobbin by rotation of the electric motor; and a remote in electronic communication with the controller, the remote comprising at least one operation button, wherein the controller instructs the electric motor to become one of: coiled around the bobbin and uncoiled from the bobbin; connecting the winch utility to the track section; auto-honing the winch utility, and operating the winch utility along the track section, wherein operation of the electric motor causes the winch utility to move with respect to the track section.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
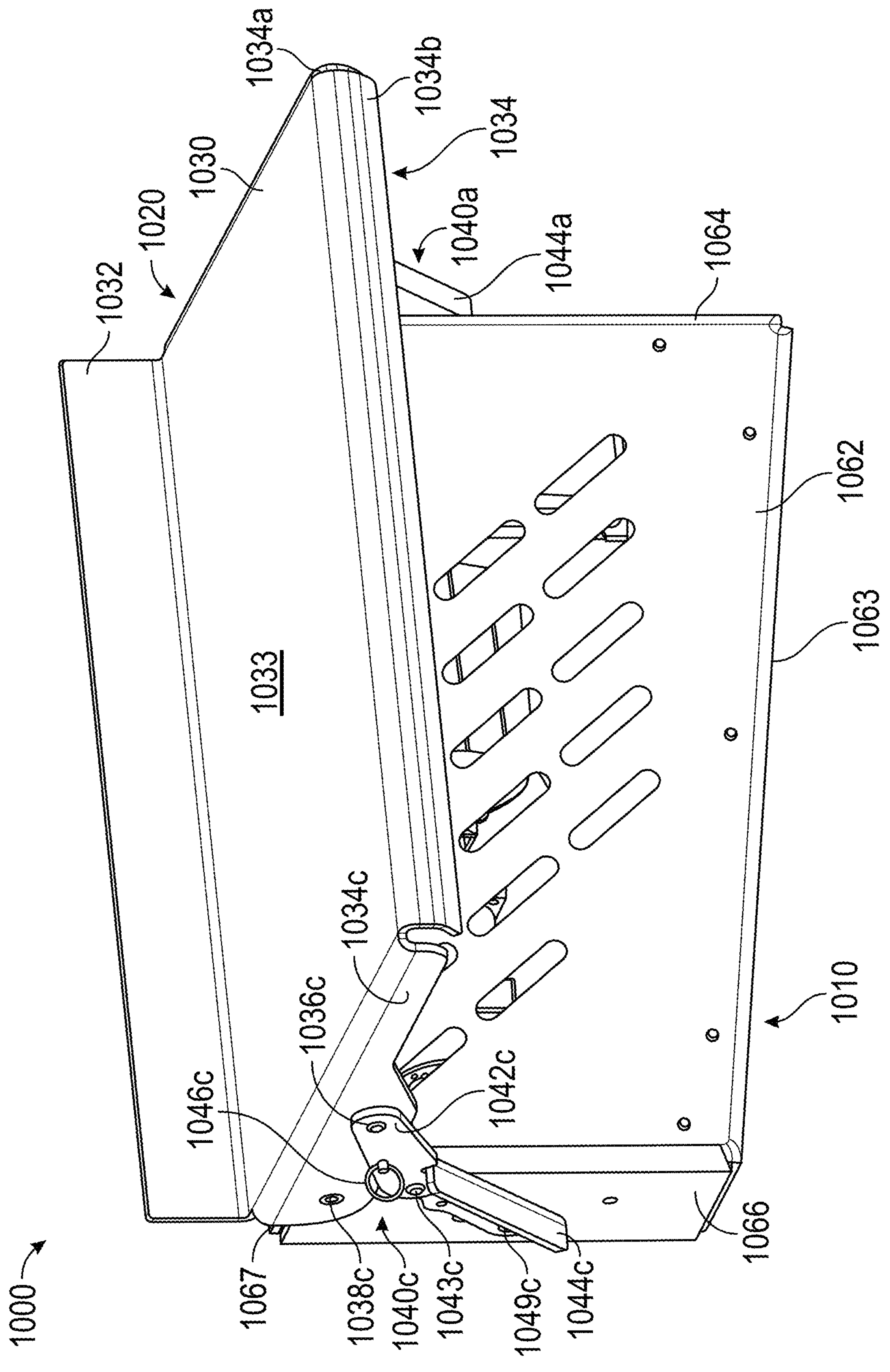
FIG. 1 is a front side perspective view of a winch utility in accord with one aspect of the current disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a winch or winch utility and associated methods, systems, devices, and various apparatus. The winch utility can comprise a system for moving items from one place to another. In some aspects, the winch utility can be a lift and can comprise functions for moving items up and down in space. In some aspects, the winch utility can be a lift attached to a track section. It would be understood by one of skill in the art that the disclosed winch is described in but a few exemplary embodiments among many. No particular terminology or description should be considered limiting on the disclosure or the scope of any claims issuing therefrom.

One embodiment of a winch utility 1000 is disclosed and described in FIG. 1. The winch utility 1000 can comprise a main body 1010 and a shelf portion 1020. In the current aspect, the winch utility 1000 as shown can be arranged to lift items from a low height to a higher location and vice versa. As such, one of skill in the art would understand that the arrangement of parts of the winch utility 1000 as currently displayed and configured can address vertical movement, although one of skill in the art would also understand that varying applications are contemplated and that the shown aspect is but one possible arrangement. The shelf portion 1020 can comprise a shelf 1030 and a rim 1032. As displayed, the rim 1032 can serve as a guard to protect items on the shelf 1030 from falling or from interfering with other parts of the winch utility 1000 that will be described in greater detail elsewhere in this disclosure. In varying aspects, the rim 1032 can be omitted. In varying aspects, the rim 1032 can continue to other edges of the shelf 1030. In varying aspects, the rim 1032 can extend around the perimeter of the shelf 1030 and thereby can enclose a surface 1033 of the shelf and assist in keeping items on the shelf portion 1020 during transport. The shelf portion 1020 can comprise an edge 1034 along at least one end of the shelf 1030. The shelf portion 1020 of the current aspect can comprise an edge 1034*a,b,c*, as shown.

In the current aspect, the edge 1034 can comprise attachment locations for the shelf portion 1020 to be attached or connected to the main body 1010. In some aspects, the shelf portion 1020 can be integrally and/or monolithically formed with the main body 1010. In some aspects, the shelf portion 1020 can be permanently connected to the main body 1010 such as by affixing, adhering, welding, or otherwise fixedly connecting the shelf portion 1020 to the main body 1010. In the current aspect, the shelf portion 1020 can be hingedly connected to the main body 1010 as shown and described. As can be seen, the edge 1034 can comprise hinge locations 1036, 1038 (shown as 1036*c* and 1038*c* on edge 1034*c* to mirror 1036*a* and 1038*a* on edge 1034*a*). Hinge locations 1036, 1038 can comprise a pin, wheel, rivet, or other attachment known in the art that can be adapted to allow parts to hinge with respect to one another.

Figure 3:
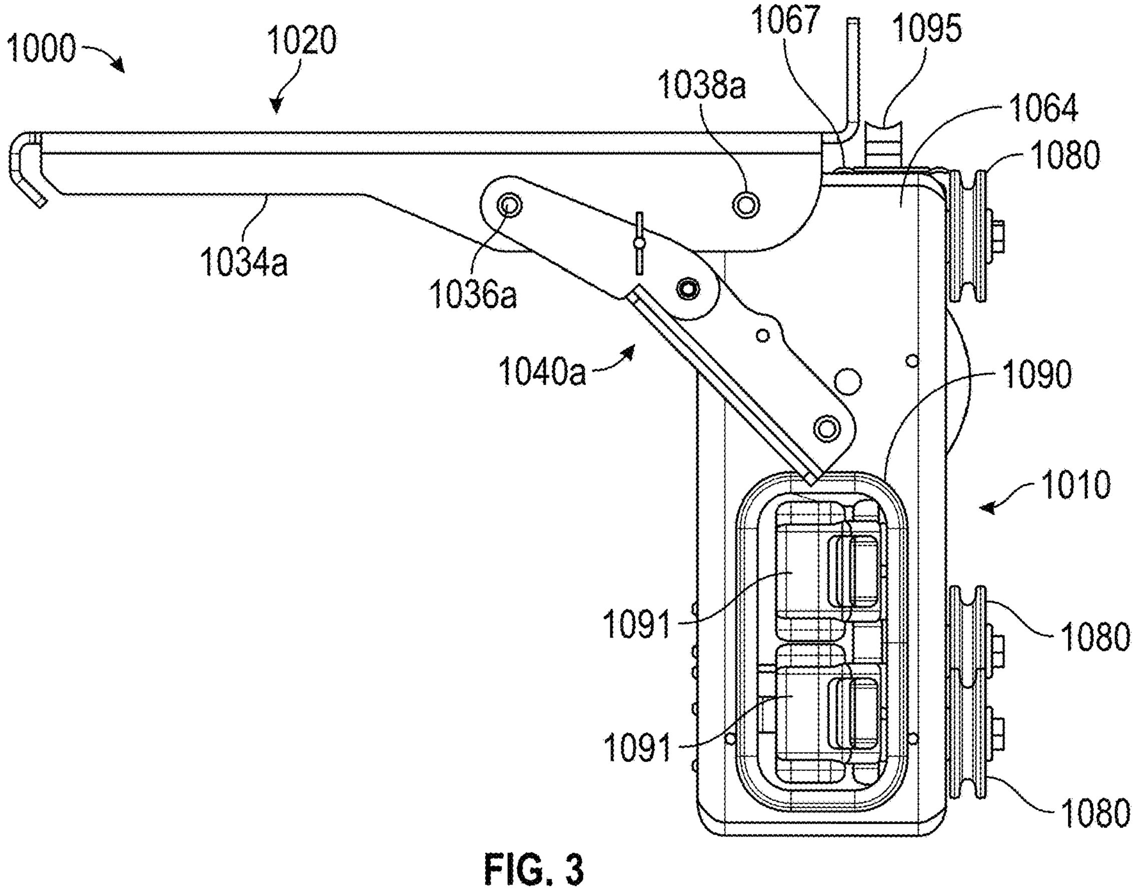
FIG. 3 is a side elevation view of the winch utility of FIG. 1.

A hinge arm assembly 1040 can be connected to the shelf portion 1020 and the main body 1010 (shown as hinge arm assembly 1040*c* to mirror hinge arm assembly 1040*a*, shown in FIG. 3). The hinge arm assembly 1040 can comprise an upper arm 1042 (shown as 1042*c*) hingedly connected to a lower arm 1044 (shown as 1044*a* and 1044*c*) at a hinge location 1043 (shown as 1043*c*). The hinge arm assembly 1040 can also optionally comprise a locking pin 1046 (shown as 1046*c*) that can be a cotter pin or various other locking mechanism and can lock the hinge arm assembly 1040 in place. In various aspects, the hinge arm assembly 1040 can be operated to lock and to unlock without the need for additional tools. The hinge arm assembly 1040 can be connected to the main body 1010 at a hinge location 1049 (shown as 1049*c*). As such, the shelf portion 1020 and the main body 1010 can be arranged to hinge with respect to one another but also can be arranged to lock or to steadily engage in various positions as optionally selected by a user of the winch utility 1000.

Figure 2:
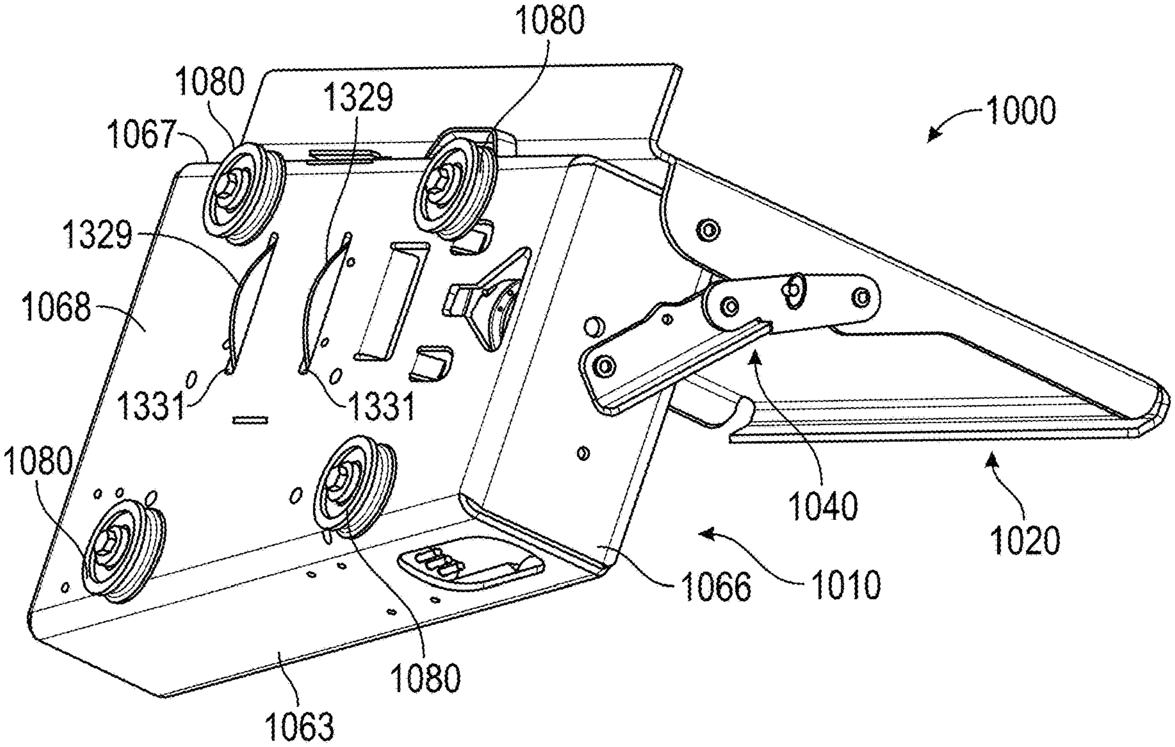
FIG. 2 is a rear side perspective view of the winch utility of FIG. 1.

The main body 1010 can comprise a shelf side 1062, a bottom side 1063, a first end side 1064, a second end side 1066, a top side 1067, and a back side 1068 (shown in FIG. 2). The main body can comprise various plates, covers, pieces, and apparatus being connected, formed, integrated, or adhered together to form the sides as described herein. One of skill in the art would understand that various methods of making the main body 1010 can be utilized without departing from the scope of the current disclosure.

As seen with reference to FIG. 2, the various sides of the main body 1010 can form an enclosure or shell. Rollers 1080 can be rotatably attached to the back side 1068 and can be arranged to interact with a track section, rail, or other linear guide (such as track section 1715 shown with reference to FIGS. 7-10). Various other types of systems can be utilized to achieve relative motion and slip resistance, including ball bearings, sliders (such as draw sliders), lubricants, and telescoping parts, among others. In the current aspect, the rollers 1080 can allow the main body 1010 and therefore the winch utility 1000 to move in translational motion on a track section, thereby being guided while not experiencing significant interference. In but one of many exemplary aspects, a track section can comprise one side of a ladder, such as in aspects where roofers need to move roofing supplies from the ground to the roof. In some aspects, the rollers 1080 can travel on inner edges of each side of the ladder, and in other aspects, the rollers 1080 can travel on outer edges of each side of the ladder. In another exemplary aspect, a track section can comprise a pole or other vertical structure. In various aspects, the rollers 1080 can be adjustable in their location or can be capable of being tightened around a track section.

As seen with reference to FIG. 3, the first end side 1064 can define a battery port 1090 which can be sized to accept batteries 1091. As shown, a pair of utility batteries 1091 can be attached to the winch utility 1000 within the battery port 1090. In various aspects, the batteries 1091 can comprise lithium-ion cordless batteries 1091 such as those utilized in various construction equipment as known in the art. In various aspects, the battery port 1090 can be configured to accept one or several different types of construction-ready rechargeable batteries 1091 readily available in the art. In various aspects, disposable and/or standard batteries can be utilized in place of batteries 1091. In various aspects, rechargeable standard batteries can be utilized in place of batteries 1091. In various aspects, integrated or custom batteries can be utilized in place of batteries 1091. Also seen, the top side 1067 can comprise a handle 1095 attached, connected, integrally, or monolithically formed with the winch utility 1000 for ease of portability. In various aspects, the winch utility 1000 can be collapsed utilizing the hinge arm assemblies 1040*a,c* to lower the shelf 1030 and then can be easily ported to other locations with use of the handle 1095.

Figure 4A:
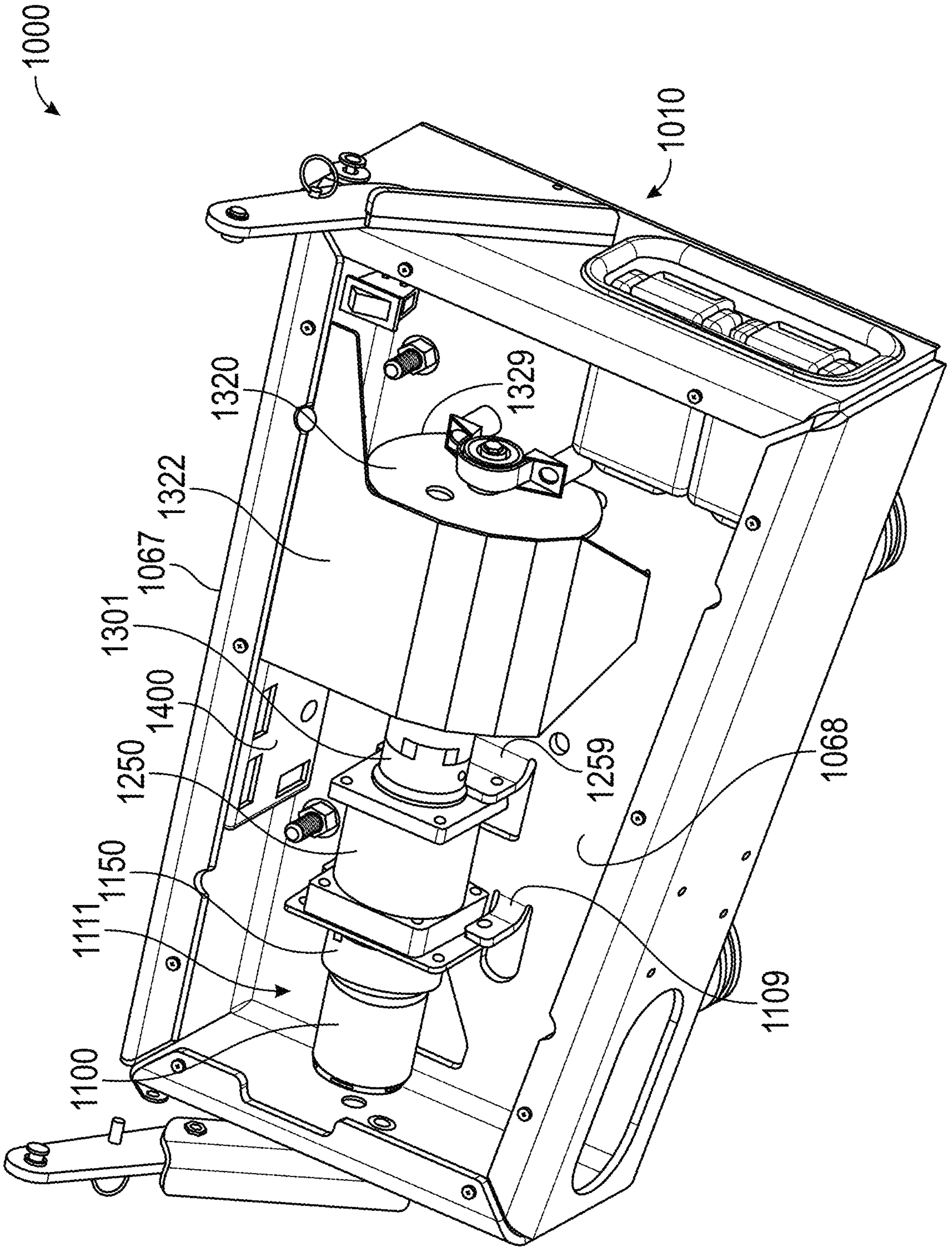
FIG. 4A is a front side perspective view of the winch utility of FIG. 1 with a shelf and a part of a cover hidden from view.
Figure 4B:
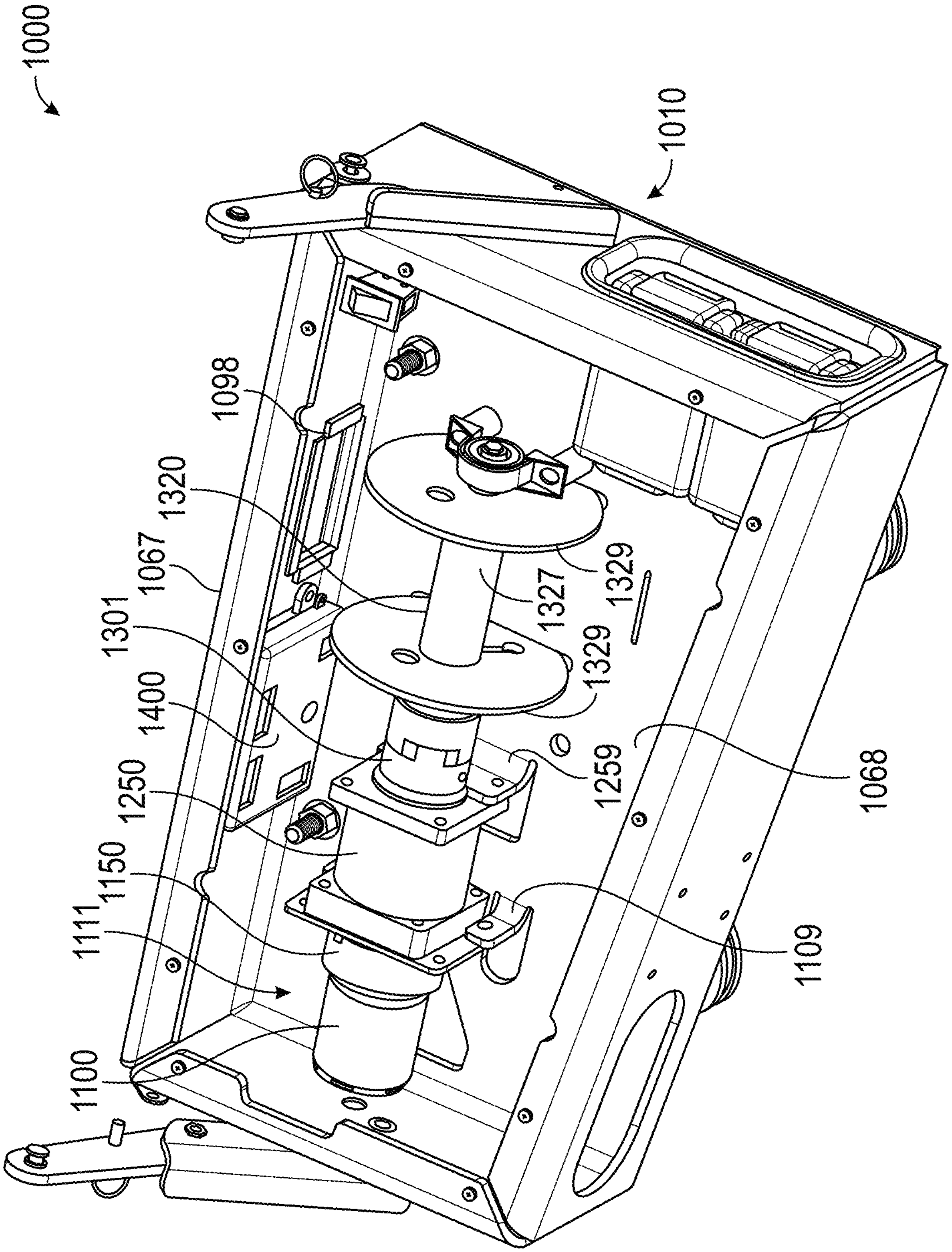
FIG. 4B is the front side perspective view of FIG. 4A with a shield hidden from view.

Seen in reference to FIGS. 4A-4B, a powertrain and various parts can be housed inside the main body 1010. An electric motor 1100 can be mounted to the main body 1010 and can comprise the first part in a powertrain assembly 1111. In various aspects, sides of the main body 1010 can be formed of metal, such as sheet metal, or various other rigid or semi-rigid materials. In various aspects, the sides of the main body 1010 can be formed of ductile materials. In the current aspect, the sides of the main body 1010 can be formed out of sheet steel or aluminum. Various features of the powertrain assembly 1111 can be attached to the sheet steel or aluminum. In various aspects, the sheet steel can comprise isolated regions that can be bent relative to the main body and can form the base onto which features of the powertrain assembly 1111 such as the electric motor 1100 can be mounted. In the current aspect, a motor mount 1109 can be formed into the back side 1068 The motor 1100 can be a 3-phase brushless motor or stepper motor. A suitable motor for use as the electric motor 1100 can be a Flipsky 6374-1. The electric motor 1100 can be coupled through an electromagnetic brake 1150 to a planetary gear set 1250. The planetary gear set 1250 can be utilized to increase torque and decrease speed of rotation of the powertrain output of the powertrain assembly 1111. A planetary gear set mount 1259 can be formed into the back side 1068. The planetary gear set 1250 can be coupled via a coupler 1301 to a bobbin 1320. In various aspects, a power inverter circuit can be utilized to convert DC power from batteries 1091 to 3-phase power, which can drive the electric motor 1100. The electromagnetic brake 1150 can be arranged in a normally-braking position, such that the default arrangement of the powertrain assembly 1111 can be braking and not in motion. A shield 1322 can be utilized to shield or to protect the bobbin 1320 and any items coiled around the bobbin 1320.

As seen with specific reference to FIG. 4B, the top side 1067 can define a cable port 1098. The cable port 1098 can allow a cable (shown as cable 1702 in FIGS. 7-10) to be coiled and uncoiled from the bobbin 1320 and threaded through the cable port 1098 outside of the winch utility 1000.

A controller 1400 can be seen inside the main body 1010. The controller 1400 can be configured with various logic to control the motion of the electric motor 1100 and, thereby, the winch utility 1000. In various aspects, the controller 1400 can be programmed with logic configured to control the circuit and provide several valuable advantages to the winch utility 1000, as will be described in greater detail elsewhere in this disclosure.

A cable (not shown) can be coiled or spooled around the bobbin 1320 with sufficient lead length to provide adequate distance between a ground location and a desired lift location. The cable can be connected to the bobbin 1320 by a bobbin end of the cable and can be coiled or spooled around the bobbin 1320. The other end—hereinafter the terminal end—of the cable can be fed through the cable port 1098. The terminal end can comprise apparatus adapted to connect to an upper end of the track section, such as the top end of a ladder. In various aspects, cable systems can be integrated into track sections or can be retrofitted to be included with track sections such that the winch utility 1000 can be utilized with custom-built cable system solutions or with off-the-shelf track sections. In various aspects, the cable can comprise a stop collar (such as stop collar 1725 shown in FIGS. 9-10) attached to the cable proximate to the terminal end that is sized larger than the cable port 1098 such that the cable is prevented from being retracted into the main body 1010.

The winch utility 1000 can be attached to a track section such as a ladder, pole, or other apparatus, whereby the rollers 1080 can be in rotatable communication with a portion of the track section. The terminal end of the cable can be attached to a portion of the track section in some aspects; in other aspects, the terminal end of the cable can be connected into a cable system for use with the winch utility 1000. Rotation of the powertrain assembly 1111 through the drive force of the electric motor 1100 can result in the cable being fed out from the bobbin 1320 or coiled around the bobbin 1320, depending on the direction of rotation of the bobbin 1320. As such, driving rotation of the electric motor 1100 can cause cable to be fed out or pulled into the main body 1010. When the terminal end of the cable is fixed—such as when the terminal end is attached to a track section or included in a cable system—tension force applied to the cable can cause the winch utility 1000 to move. If the cable is drawn in by the powertrain assembly 1111 such that the cable can be coiled around the bobbin 1320, the winch utility 1000 can move in translation toward the terminal end of the cable. Similarly, if the cable is fed out by the powertrain assembly 1111 such that the cable can be uncoiled from the bobbin 1320, the winch utility 1000 can move in translation away from the terminal end of the cable. The rollers 1080 can provide a guide, being in communication with the track section, such that the winch utility 1000 can be kept in alignment with the track section.

Seen with returning reference to FIGS. 2, 4A, and 4B, the bobbin 1320 can comprise a spindle 1327 and a pair of guides 1329 or flanges. In the current aspect, the guides 1329 can extend through guide ports 1331 the back side 1068. The guide ports 1331 can allow the guides 1329 to perform the function of guiding the cable on the bobbin 1320 but can also allow the bobbin 1320 to be placed in close proximity to the back side 1068. In the currently presented arrangement, the powertrain assembly 1111 can be more easily mounted inside the main body 1010 and sufficiently fit inside the main body. A user can communicate with the controller 1400 using a remote control, such as an RF, corded, or IR remote. Various buttons can be included in the remote, and one of skill in the art would understand that no single configuration of buttons should be considered limiting on the scope of the current disclosure. In various aspects, the winch utility 1000 can comprise integrated buttons or controls. In various aspects, Wi-Fi, Bluetooth, and other near field communication technologies can be utilized to communicate with the controller 1400.

The controller 1400 can comprise logic configured to make the use and operation of the winch utility 1000 simple and helpful. In one aspect, on initial power-up of the unit, the winch utility 1000 can comprise an auto-hone feature. Upon instruction, the auto-hone feature can allow the winch utility 1000 to know its position on a track section. When instructed—usually on power-up or at first use—the winch utility 1000 can be instructed to hone. When such instructions are given, the controller 1400 can instruct the electric motor 1100 to draw in the cable at a relatively slow rate of speed. When the cable is drawn in, the electric current within the electric motor 1100 can be monitored and recorded by the controller 1400. During operation, the current can be expected to remain about constant. However, the electric current in the electric motor 1100 can increase substantially when the cable is drawn in to its furthest extent, such as when the stop collar of the cable contacts the edge of the cable port 1098 or when other interference occurs. If the electric current in the electric motor 1100 increases or "spikes," the controller 1400 can instruct the electric motor 1100 to stop drawing cable in. The controller 1400 can record the position of the electric motor 1100 as the top of the track section and can impose a software-based stop on the electric motor 1100 so that the electric motor 1100 can be prevented from driving past that placement. In various aspects, the current threshold used to note a substantial or significant "spike" in the current to determine a stop location can be 20% increase in the current. In various aspects, thresholds can range from 10% to 100% increase in current before annotating the spike as a substantial or significant spike to record a stop location. It should be noted that the functionality described can be achieved without additional sensors other than the electric motor 1100, although in various aspects various sensors can be included either for redundancy or for primary placement monitoring.

The auto-hone feature described herein can be of great use for single-touch operation. For example, if the winch utility 1000 were unable to determine a top location of the track section on its own, then a user might have to maintain a visual monitor of the winch utility 1000 and manually operate the winch utility 1000 and the electric motor 1100 to prevent it from being over-driven or over-rotated. However, if the winch utility 1000 can auto-hone, the user can use a single-push operation or single instruction to send the winch utility 1000 and any payload on the shelf 1030 up to the top of the track section without having to monitor the position of the winch utility 1000 on the track section.

In an advantage, the electric motor 1100 can travel at various speeds, and, in particular, can travel faster for small, light loads while still maintaining sufficient power to hoist larger or heavier loads. The electric motor 1100 can be controlled by the controller 1400 with acceleration limits, speed limits, shock limits, and even speed-determined differential controls. Because of the position-aware capabilities of the electric motor 1100, the controller 1400 can comprise logic to provide additional balancing of loads and to avoid dropping loads. As previously mentioned, the electromagnetic brake 1150 can be arranged in a normally-braking position. As a result, the winch utility 1000 can be utilized for loading while in descent, a feature not found in elsewhere in utilities that address similar problems.

Figure 5:
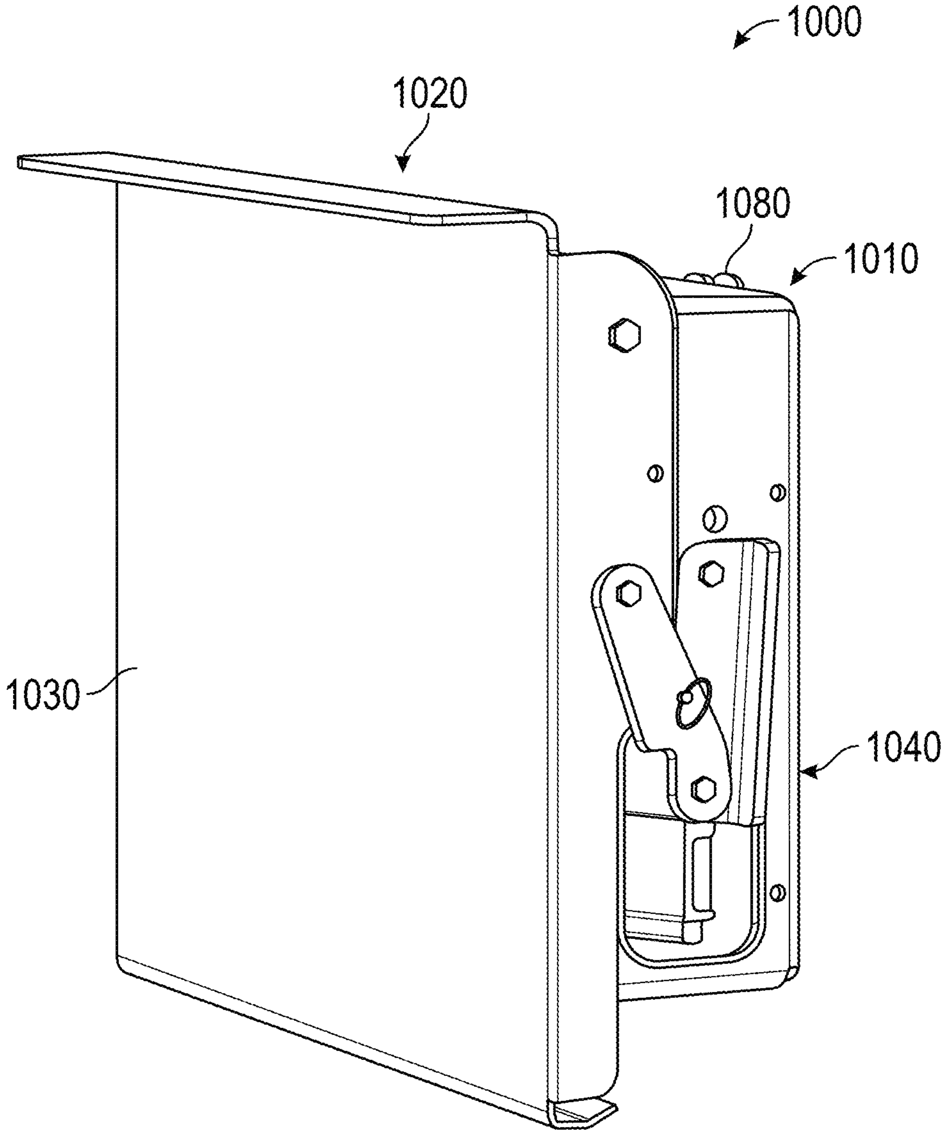
FIG. 5 is a front side perspective view of the winch utility of FIG. 1 in a collapsed arrangement.
Figure 6:
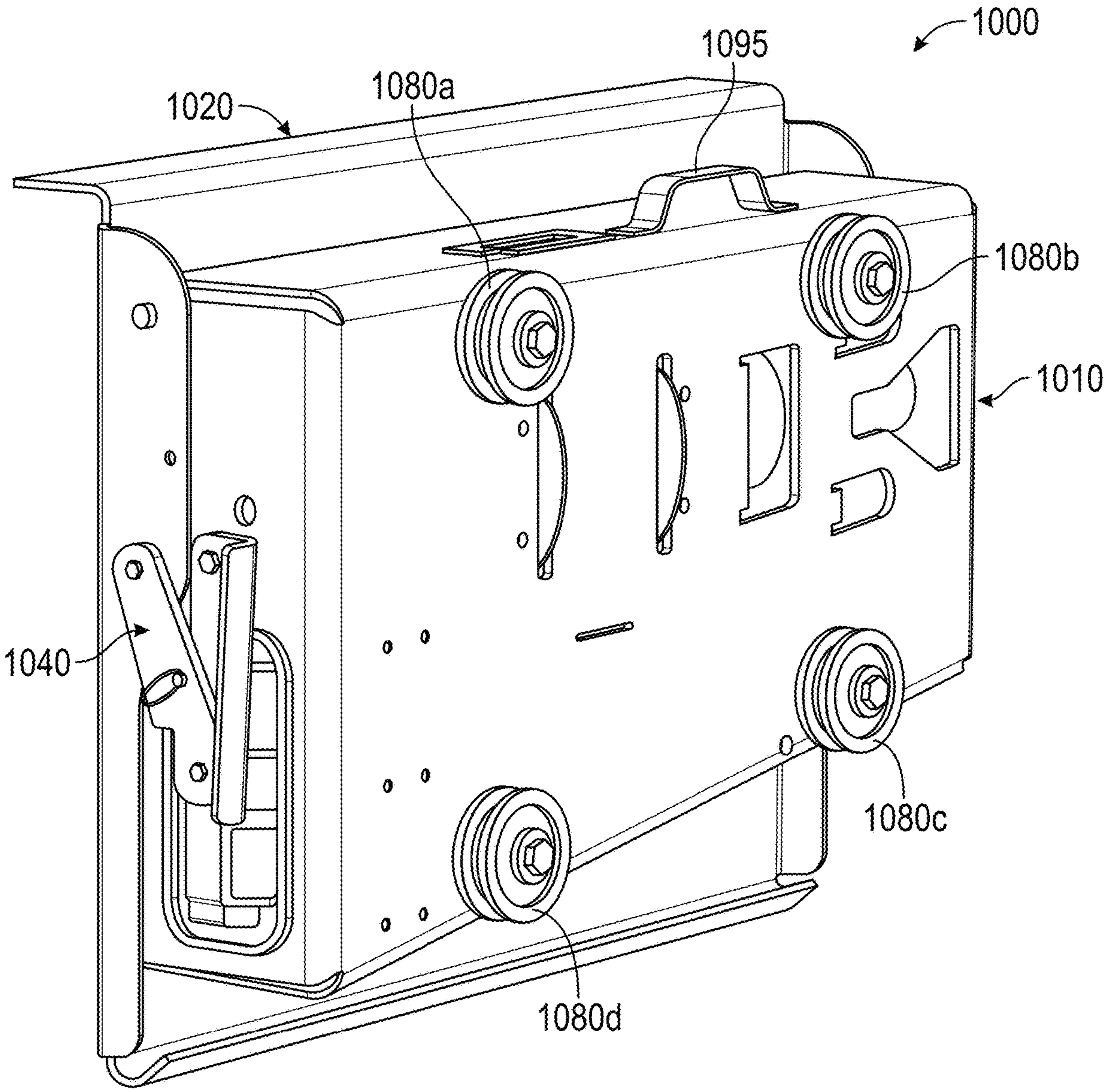
FIG. 6 is a rear side perspective view of the winch utility of FIG. 5.
Figure 7:
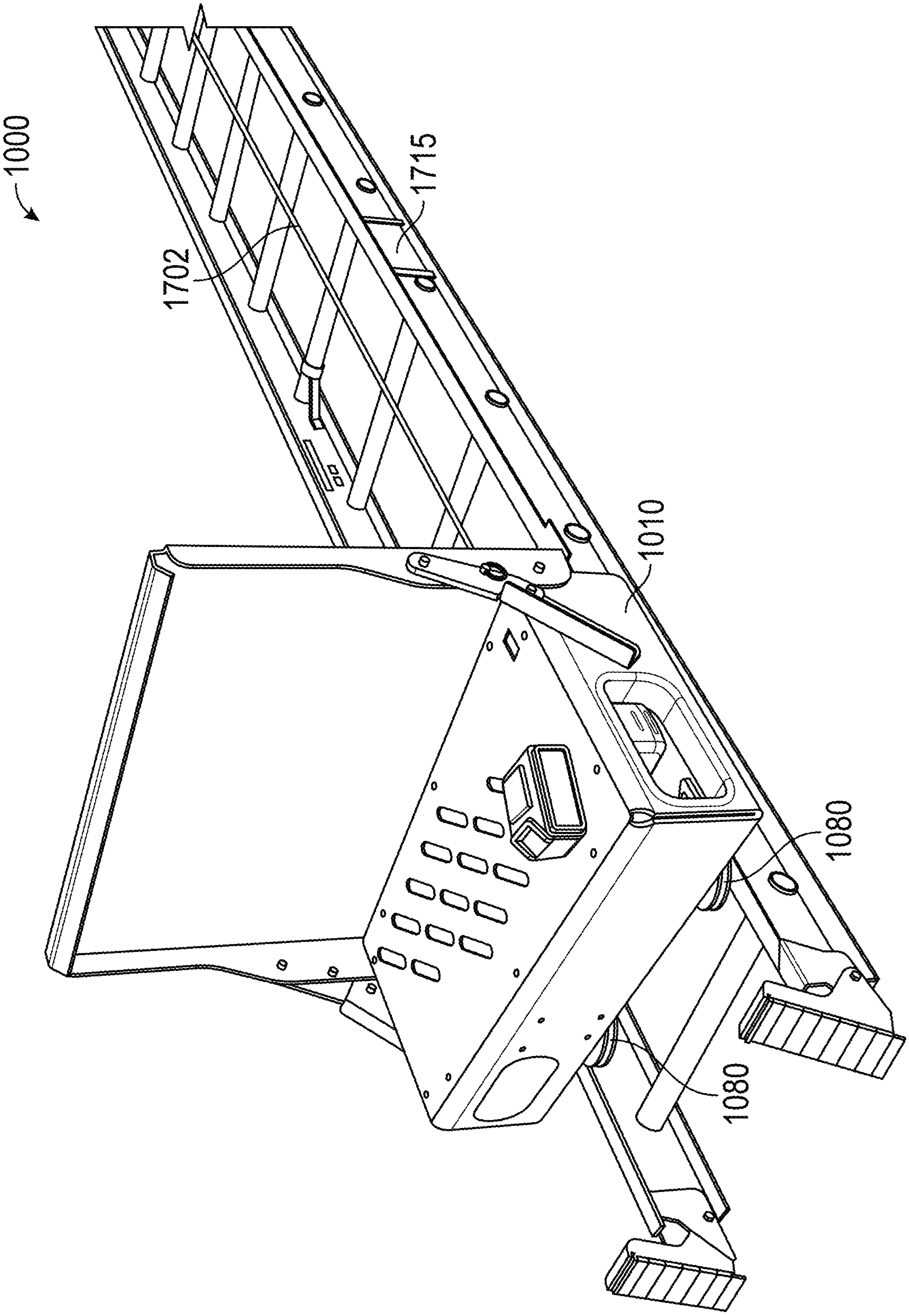
FIG. 7 is a perspective view of the winch utility of FIG. 1 attached to an exemplary track section.
Figure 8:
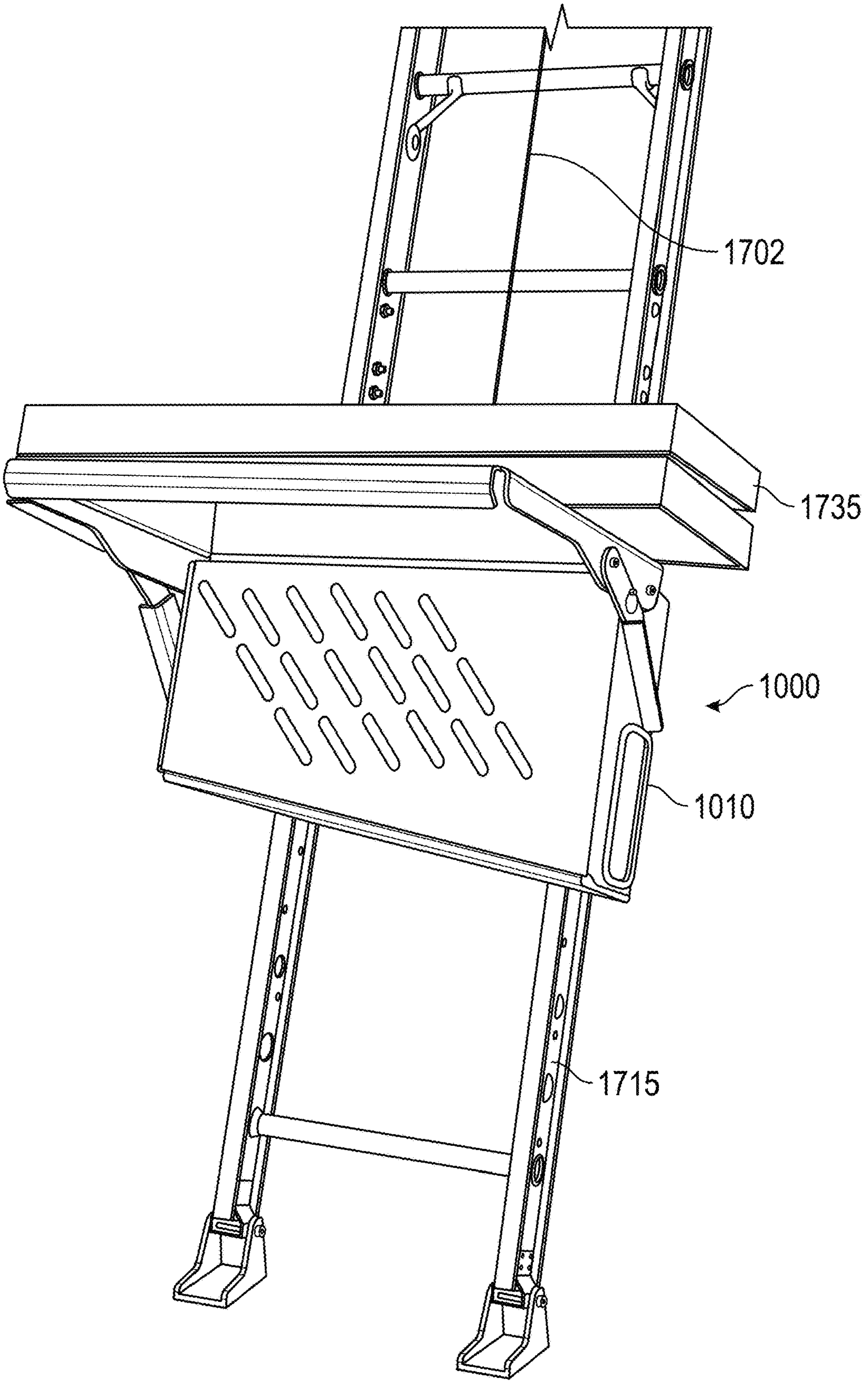
FIG. 8 is another perspective view of the winch utility attached to the exemplary track section, as previously displayed in FIG. 7.

As seen with reference to FIGS. 5-6, the winch utility 1000 can be collapsible by collapsing the hinge arm assemblies 1040. When collapsed, the handle 1095 can be used to hold the winch utility 1000 and transport it from place to place.

As seen with reference to FIG. 6, the rollers 1080 are referred separately as 1080*a*, 1080*b*, 1080*c*, and 1080*d*. In the current aspect, the roller 1080*d* can be arranged in space in a non-congruent relationship to the other rollers 1080*a, b,c*. Specifically, roller 1080*a* can be arranged orthogonally to roller 1080*b* and 1080*d*, and roller 1080*b* can be arranged orthogonally to roller 1080*a* and 1080*c*. However, in the current aspect, roller 1080*c* can be arranged to form an oblique angle between roller 1080*b* and roller 1080*d*, and roller 1080*d* can be arranged to form an acute angle between roller 1080*a* and roller 1080*c*. In the current aspect, the off-pattern arrangement of roller 1080*d* can serve to increase the moment arm in bracing the winch utility 1000 against the track section. Unless the electric motor 1100 and the bobbin 1320 are balanced or centered about the center of gravity of the winch utility 1000, forces generated by the tension in the cable can create a moment or torque on the rollers 1080 and their interaction with the track section. Although the rollers 1080 can be arranged in a basic pattern such as a square or rectangle, in various aspects uneven wearing of the rollers 1080 can occur. As such, by arranging the rollers 1080 in an off-pattern arrangement, moments can be about balanced on each of the rollers 1080*a,b,c,d*, and the wearing of the rollers 1080 can become more uniform.

The winch utility 1000 can be seen in environment of use with reference to FIGS. 7-10. With specific reference to FIG. 7, the winch utility 1000 can be shown in attachment to the track section 1715, which in the current aspect can be a ladder. The rollers 1080 can be seen along an inner portion of the track section 1715. The cable 1702 can be seen extended in tension, and can be connected to a distal end of the track section 1715 as will be shown in additional figures. The winch utility 1000 can be shown carrying a payload 1735 with reference to FIG. 8. The payload 1735 can be any materials to elevate, but in the current aspect roofing shingles are shown for exemplary purposes. The winch utility 1000 can be seen in an elevated position from the ground with its weight and the weight of the payload 1735 being held by the cable 1702.

Figure 9:
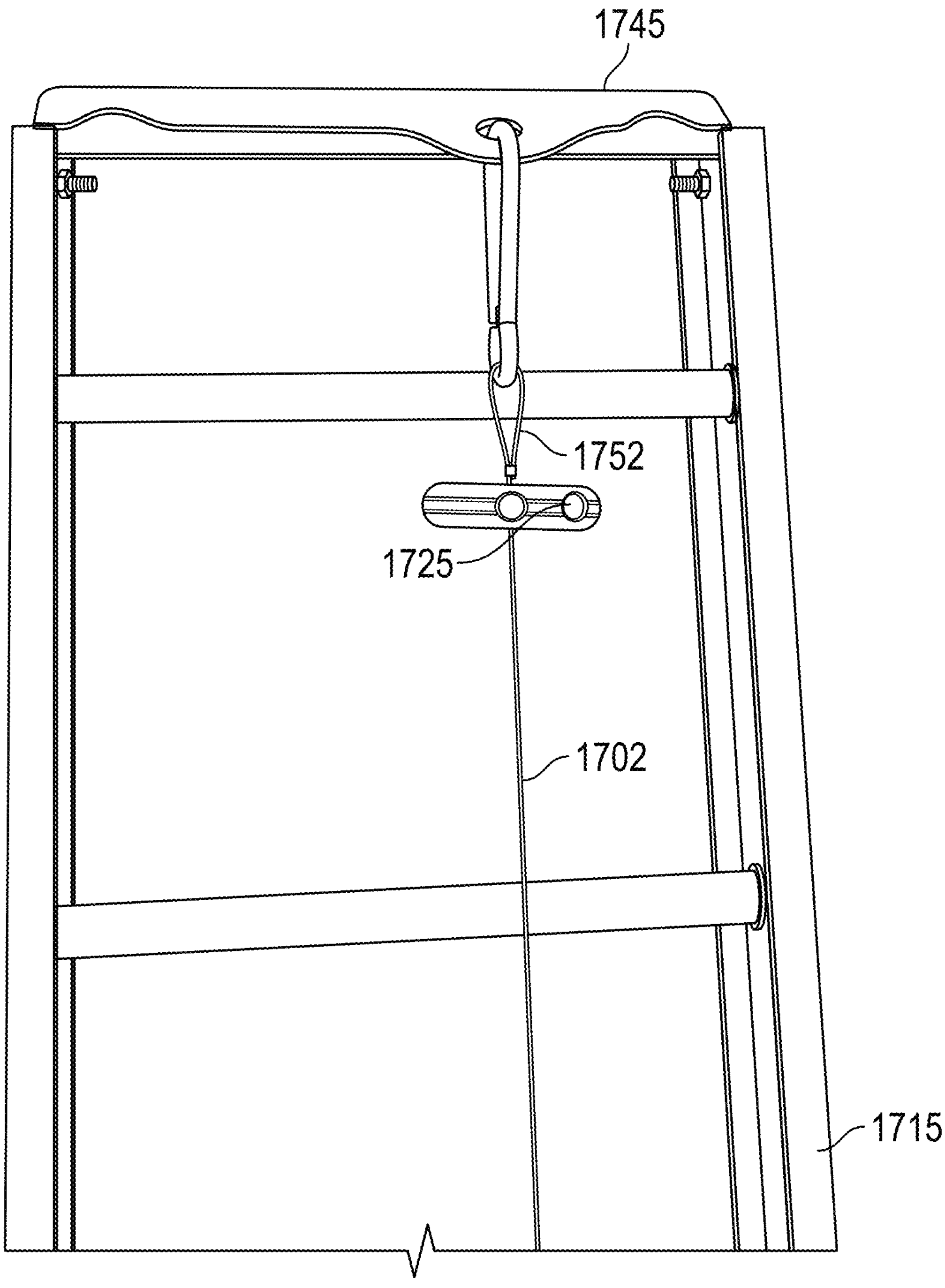
FIG. 9 is a perspective view of a cable of the winch utility of FIG. 1 as attached to the exemplary track section as previously displayed in FIG. 7.
Figure 10:
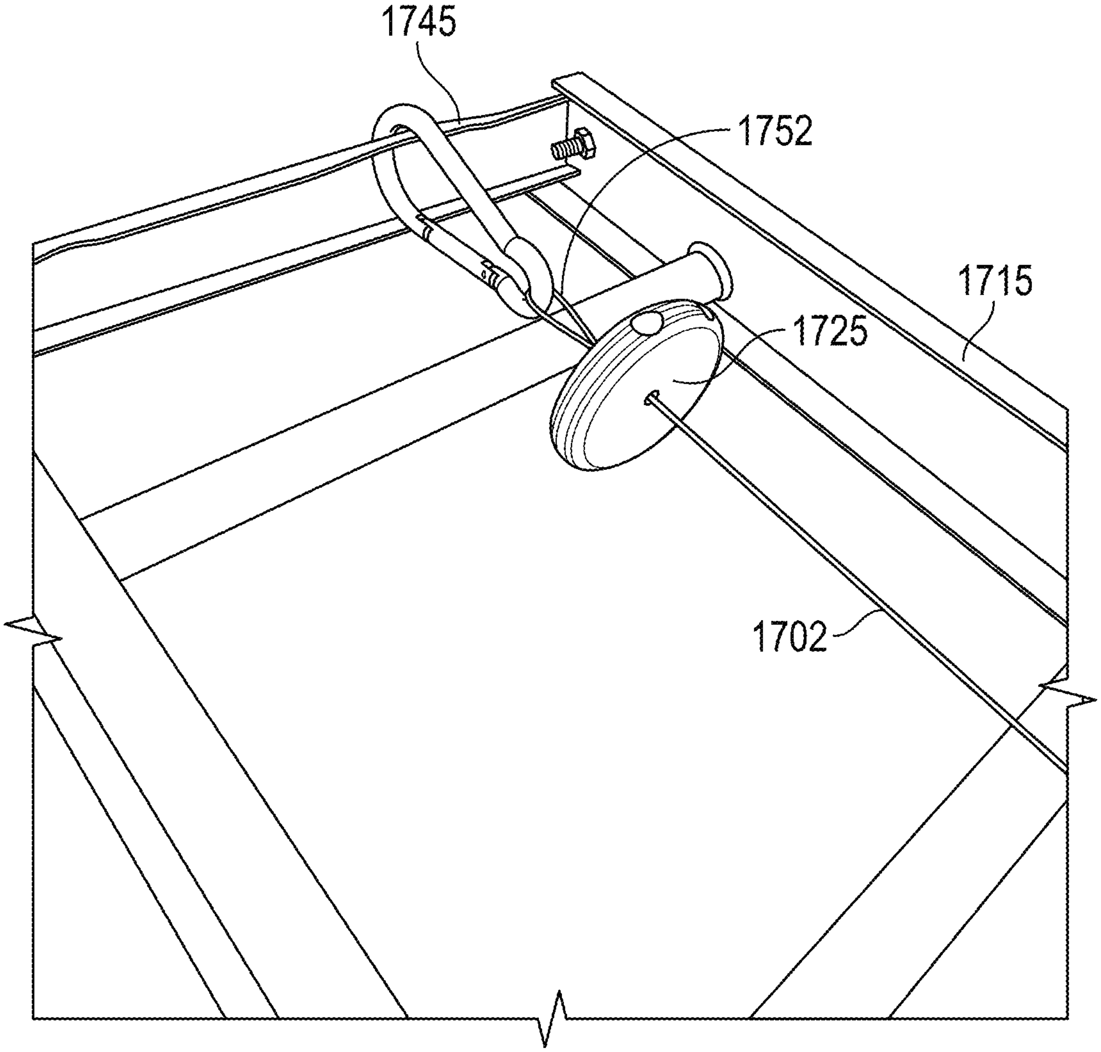
FIG. 10 is another perspective view of the cable attached to the exemplary track section as previously displayed in FIG. 9.

Attachment of the cable 1702 to a distal end 1745 of the track section 1715 can be seen with reference to FIGS. 9-10. The cable 1702 can be attached to the track section 1715 utilizing a carabiner, spring clip, i-hook, j-hook, or various other mechanical interactions as would be understood by one of skill in the art. Also seen is the stop collar 1725, which can prevent a distal end 1752 of the cable 1702 from being drawn into the interior of the main body 1010 when winch utility 1000 is in use.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A winch utility comprising:

a main body comprising a shell, the shell defining an enclosure;

an electric motor mounted to and contained within at least a portion of the shell;

a controller attached to an inner part of the shell and in electronic communication with the electric motor; and a bobbin coupled to the electric motor, the bobbin comprising a spindle and a flange, the flange extending outward from a back side of the shell; and a cable coupled to the bobbin at a bobbin end, the cable defining a terminal end distal to the bobbin end, the cable arranged to be coiled around the bobbin by rotation of the electric motor wherein the terminal end of the cable is arranged outside of the shell, the flange configured to guide the cable on the bobbin;

wherein the controller is configured to instruct the electric motor.

2. The winch utility of claim 1, wherein motion of the electric motor causes the main body to move with respect to the terminal end, wherein the motion of the main body is one of:

motion of the main body closer to the terminal end; and motion of the main body further from the terminal end.

3. The winch utility of claim 2, wherein motion of the electric motor causes the main body to move with respect to the terminal end by the cable becoming one of:

coiled around the bobbin; and uncoiled from the bobbin.

4. The winch utility of claim 1, wherein the shell defines a cable port and wherein at least a portion of the cable is arranged within the cable port.

5. The winch utility of claim 1, wherein at least one shelf is hingedly connected to the main body.

6. The winch utility of claim 5, further comprising a hinge arm assembly, the hinge arm assembly comprising an upper arm hingedly connected to the at least one shelf, the upper arm hingedly connected to a lower arm, and the lower arm hingedly connected to the main body, wherein the hinged connection of the at least one shelf to the main body comprises the hinge arm assembly.

7. The winch utility of claim 1, wherein the terminal end of the cable is fixed to a track section, and wherein the electric motor is configured to move the winch utility relative to the track section.

8. The winch utility of claim 7, wherein the controller comprises logic to enable single push operation of the winch utility.

9. The winch utility of claim 1, wherein the controller comprises logic to auto-hone the winch utility, wherein the auto-hone logic comprises monitoring the electric current in the electric motor and recording a software stop position when the current increases substantially.

10. The winch utility of claim 1, wherein the electric motor is one of a brushless motor or a stepper motor.

11. The winch utility of claim 1, wherein an electromagnetic brake is attached to the electric motor.

12. The winch utility of claim 11, wherein the electromagnetic brake is arranged in a normally-braking position.

13. The winch utility of claim 1, wherein the flange extends through a guide port formed through the back side of the shell.

14. A winch utility for use with a linear guide, the winch utility comprising:

a main body, the main body comprising: a shell, the shell defining an enclosure;

an electric motor mounted to and contained within at least a portion of the shell;

a controller in electronic communication with the electric motor;

a bobbin coupled to the electric motor, the bobbin comprising a spindle and a flange, the flange extending outward from a back side of the shell; and a cable coupled to the bobbin at a bobbin end, the cable defining a terminal end distal to the bobbin end attached to the linear guide, the cable configured to be coiled around the bobbin by rotation of the electric motor, the flange configured to guide the cable on the bobbin; and a remote control in electronic communication with the controller, the remote control comprising at least one operation button;

wherein motion of the electric motor causes the main body to move with respect to the terminal end, wherein the motion of the main body is one of:

motion of the main body closer to the terminal end; and motion of the main body further from the terminal end.

15. The winch utility of claim 14, wherein motion of the electric motor causes the main body to move with respect to the terminal end by the cable becoming one of:

coiled around the bobbin; and uncoiled from the bobbin.

16. The winch utility of claim 14, wherein the controller comprises logic enabling single push operation of the winch utility.

17. The winch utility of claim 14, wherein the controller comprises logic configured to auto-hone the winch utility.

18. The winch utility of claim 14, wherein the electric motor drives the winch utility at varying speeds depending on a weight of a load carried by the winch utility.

19. The winch utility of claim 14, further comprising at least one shelf hingedly attached to the main body.

20. The winch utility of claim 14, wherein the remote control is an RF remote.

21. The winch utility of claim 14, wherein an electromagnetic brake is attached to the electric motor.

22. The winch utility of claim 14, wherein the flange extends through a guide port formed through the back side of the shell.

* * * * *